United States Patent Office 3,000,948
Patented Sept. 19, 1961

3,000,948
NITRAMINES
Milton B. Frankel, Pasadena, and Karl Klager, Monrovia, Calif., assignors to Aerojet-General Corporation, Azusa, Calif., a corporation of Ohio
No Drawing. Filed Feb. 19, 1957, Ser. No. 641,437
11 Claims. (Cl. 260—583)

This invention relates to new compositions of matter useful as high explosives and a method for their preparation. In particular, this invention relates to nitramines having the general formula:

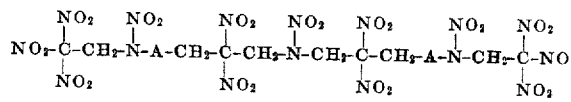

wherein A is an alkylene radical.

This application is a continuation-in-part of our co-pending application Serial No. 451,706, filed August 23, 1954, now abandoned.

The compounds of this invention are prepared by nitrating a secondary diamine, in accordance with the general reaction scheme set forth below:

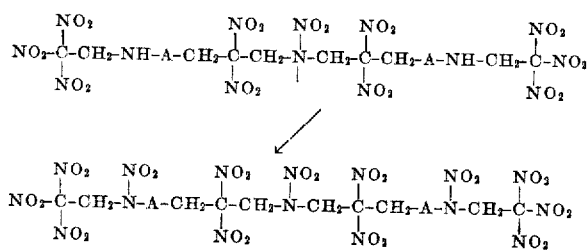

wherein A is an alkylene radical.

The secondary diamines used as starting materials in this invention are prepared by condensing a polynitro amine with 2,2,2-trinitroethanol, as disclosed in our co-pending application No. 451,705, filed August 23, 1954, now abandoned.

The nitration is effected in the conventional manner with nitric acid, however, we have found it desirable to employ a mixture of about equal amounts of nitric and sulfuric acid in order to hasten completion of the reaction.

To more clearly illustrate our invention, the following example is presented. It is to be understood, however, that this example is presented merely as a means of illustration, and is not intended to limit the scope of the invention in any way.

EXAMPLE I

*Preparation of 1,1,1,3,6,6,8,10,10,13,15,15,15-tridecanitro-3,8,13-triaza pentadecane*

In a flask fitted with a mechanical stirrer and thermometer, was placed 40 ml. of concentrated sulfuric acid and 40 ml. of 100% nitric acid. The mixture was cooled to 5° C. and 4 gm. of 1,1,1,6,6,8,10,10,15,15,15-undecanitro-3,8,13-triaza pentadecane was added. The mixture was warmed to a temperature of 30° C. for 1 hour. The mixture was then heated to a temperature of 40–45° C. for a period of one-half hour. After cooling, a white solid precipitated which was collected, washed with water and dried. Recrystallization from nitromethane-carbon tetrachloride yielded 1,1,1,3,6,6,8, 10,10,13,15,15,15 - tridecanitro - 3,8,13 - triaza pentadecane, m.p. 186–187° C., with decomposition. The elemental analysis of the product is as follows:

Calculated for $C_{12}H_{16}N_{16}O_{16}$: percent C, 18.01; percent H, 2.02; percent N, 28.00. Found: percent C, 18.43; percent H, 2.42; percent N, 27.85.

We have also found that secondary diamines such as 1,1,1,7,7,9,11,11,17,17,17 - undecanitro - 3,9,15 - triaza heptadecane, 1,1,1,8,8,10,12,12,19,19,19 - undecanitro - 3,10,17-triaza nonadecane, and 1,1,1,9,9,11,13,13,21,21,21-undecanitro-3,11,19-triaza hemeicosane readily undergo nitration with nitric acid to form their corresponding nitramines, namely, 1,1,1,3,7,7,9,11,11,15,17,17,17 - tridecanitro - 3,9,15 - triaza heptadecane, 1,1,1,3,8,8,10, 12,12,17,19,19,19 - tridecanitro - 3,10,17 - triaza nonadecane, and 1,1,1,3,9,9,11,13,13,19,21,21,21-tridecanitro-3,11,19-triaza hemeicosane.

From the discussion above, it is apparent that any member of this series of nitramines may be prepared simply by reacting an appropriate secondary diamine with nitric acid, in accordance with the teachings of this invention.

The new nitramines of our invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an imact- or time fuse-mechanism firing a detonating explosive such as lead azide or mercury fulminate.

We claim:
1. As compositions of matter, the nitramines having the formula:

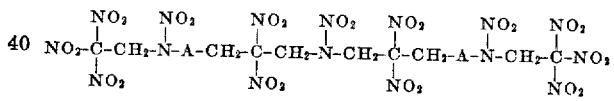

wherein A is a lower alkylene radical.

2. As a composition of matter, 1,1,1,3,6,6,8,10,10,13, 15,15,15-tridecanitro-3,8,13-triaza pentadecane having the structural formula:

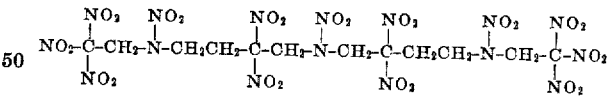

3. As a composition of matter, 1,1,1,3,7,7,9,11,11,15, 17,17,17-tridecanitro-3,9,15-triaza heptadecane having the structural formula:

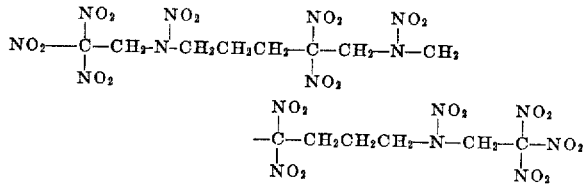

4. As a composition of matter, 1,1,1,3,8,8,10,12,12,17, 19,19,19 - tridecanitro - 3,10,17 - triaza nonadecane having the structural formula:

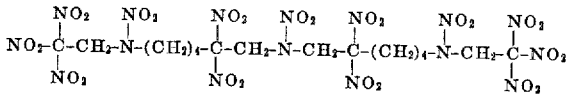

5. As a composition of matter, 1,1,1,3,9,9,11,13,13,19, 21,21,21 - tridecanitro - 3,11,19 - triaza hemeicosane having the structural formula:

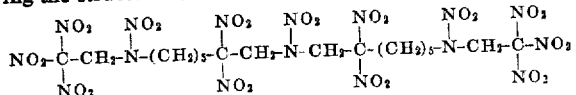

6. The method of preparing nitramines having the formula:

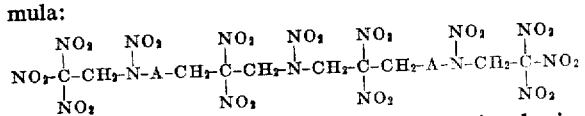

which comprises nitrating a secondary diamine having the formula:

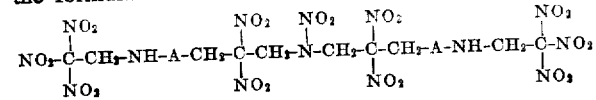

wherein A is a lower alkylene radical.

7. The method of claim 6 wherein the nitration is effected by a mixture of sulfuric and nitric acid.

8. The method of preparing 1,1,1,3,6,6,8,10,10,13,15,15,15-tridecanitro-3,8,13-triaza pentadecane which comprises nitrating 1,1,1,6,6,8,10,10,15,15,15 - undecanitro-3,8,13-triaza pentadecane.

9. The method of preparing 1,1,1,3,7,7,9,11,11,15,17,17,17-tridecanitro-3,9,15-triaza heptadecane which comprises nitrating 1,1,1,7,7,9,11,11,17,17,17 - undecanitro-3,9,15-triaza heptadecane.

10. The method of preparing 1,1,1,3,8,8,10,12,12,17,19,19,19 - tridecanitro - 3,10,17 - triaza nonadecane which comprises nitrating 1,1,1,8,8,10,12,12,19,19,19 - undecanitro-3,10,17-triaza nonadecane.

11. The method of preparing 1,1,1,3,9,9,11,13,13,19,21,21,21 - tridecanitro - 3,11,19 - triaza hemeicosane which comprises nitrating 1,1,1,9,9,11,13,13,21,21,21 - undecanitro-3,11,19-triaza hemeicosane.

References Cited in the file of this patent

Weygand: "Organic Preparations," Interscience Publishers, Inc., N.Y., 1945, pp. 280–284.